United States Patent [19]

Goldberg

[11] 3,973,122
[45] Aug. 3, 1976

[54] MEASURING APPARATUS
[75] Inventor: Arthur E. Goldberg, Evanston, Ill.
[73] Assignee: Ixcon Inc., Skokie, Ill.
[22] Filed: June 17, 1974
[21] Appl. No.: 479,602

[52] U.S. Cl. .............................. 250/338; 73/355 R; 250/341
[51] Int. Cl.² .......................................... G01J 1/00
[58] Field of Search ........... 250/338, 339, 341, 358, 250/359, 312; 73/355 R

[56] References Cited
UNITED STATES PATENTS

| | | | |
|---|---|---|---|
| 2,930,893 | 3/1960 | Carpenter | 250/339 |
| 2,960,612 | 11/1960 | Koulicovitch | 250/338 |
| 3,091,693 | 5/1963 | Rudomanski et al. | 73/355 R |
| 3,206,603 | 9/1965 | Mauro | 250/341 |
| 3,245,261 | 4/1966 | Buteux et al. | 250/341 |
| 3,350,562 | 10/1967 | Flint | 73/355 R |
| 3,350,562 | 3/1967 | Gunji | 73/355 R |
| 3,427,861 | 2/1969 | Maley | 250/358 |
| 3,433,052 | 3/1969 | Maley | 250/358 |
| 3,631,526 | 12/1971 | Brunton | 250/338 |
| 3,767,920 | 10/1973 | Kido et al. | 250/359 |
| 3,803,414 | 4/1974 | Van Horne et al. | 250/341 |

Primary Examiner—Harold A. Dixon
Attorney, Agent, or Firm—Morris Spector

[57] ABSTRACT

An apparatus and method for measuring the thickness of a protective film on a sheet or substrate as the sheet moves past the apparatus. The apparatus includes a black-body radiator in the form of an isothermal cavity having an opening across which the sheet is moved. The cavity has an observation window opposite the opening through which window the surface of the moving sheet may be scanned. A radiation pyrometer scans the moving sheet through the observation opening. Rays from the radiator pass through the film to the substrate, are reflected by the substrate, and pass back through the film and through the window to the pyrometer. The absorption of rays from the black-body radiator as they pass through the film is a function of the thickness of the portion of the film being observed. The radiation pyrometer thus receives an output which is a function of the film thickness being measured.

16 Claims, 4 Drawing Figures

MEASURING APPARATUS

BACKGROUND AND SUMMARY OF THE INVENTION

This invention relates to the measurement of the thickness of a film on a substrate to determine if the thickness is within prescribed maximum and minimum limits. One application of this invention is to measure the thickness of a protective plastic film on a sheet of metal or other self-sustaining material used in the can making industry.

It is old to measure film thickness upon a substrate by passing a beam of light therethrough and measuring the absorption of the beam in passing through the film, which absorption is a function of film thickness. If the substrate is moving at a high speed, measurements present a problem due to the bounce of the sheet, or due to the formation of creases, particularly if the sheet is quite thin and is subject to creasing. In the case of an opaque substrate that has reflecting powers, it is common to measure the film thickness by measuring the light absorption as a beam of light passes through the film and is reflected from the base or substrate to pass through the film again. Flexing of the substrate causes uncontrolled changes in the direction of the reflected light beam, and may drastically affect the measuring action. It is an object of this invention to provide a measuring apparatus of the above type wherein normal flexing or bouncing of the moving material under measurement, or the normal light dispersion within the material being measured, will not substantially affect the measurements. This is accomplished, in accordance with a preferred embodiment of this invention, by providing a light source which is a black-body radiator that is maintained at a regulated temperature so that the infra-red light rays emitted thereby are of substantially known wave lengths, and locating that radiator in a position such that it substantially encircles the area of the film that is being scanned at any particular instant in time whereby all observations of said area regardless of the angle of normal flexing of the material will still constitute an observation of some area of the radiator. The radiator is maintained at a uniform light intensity throughout its entire area. In one preferred embodiment, the black-body radiator is an isothermal cavity that is substantially hemispherical in shape, and the portion of the moving film that is being examined at any instant in time is a portion that is located approximately at the center of the hemisphere. A pyrometer is responsive to the infra-red or other rays radiated by the source. An infra-red pyrometer is useful for this measurement since it must operate on a wave length region of high absorption by the subject material of the film. Since the pyrometer responds not only to the radiation from the source passing through the film, but also the infra-red radiation from the surface of the film itself, it is important that the source radiation be of a high intensity compared to the radiation from the film surface itself. Therefore, the source radiation is maintained at a high temperature, say at the order of 500°F (or more) when the film temperature is room temperature. The film whose thickness is being measured is at a temperature at the order of 125°F or less. In the range of wave lengths used, the infra-red radiation is an exponential function of the temperature. That function is generally above the fourth power. Therefore, the infra-red radiation of the film being measured is a negligible part of the infra-red radiation of the black-body radiator.

The attainment of the above and further objects of this invention will be apparent from the following specification taken in conjunction with the accompanying drawing forming a part thereof.

DESCRIPTION OF PREFERRED EMBODIMENT

In the drawings, like reference numerals designate like parts throughout.

At 1 there is indicated a coated sheet comprising a substrate 2 that has a reflecting metallic surface 3 on which is coated a protective film 4. The substrate 2 is opaque to infra-red rays. It may be a sheet of tinplate or aluminum, as used in the can making industry, or it may be a reflecting foil which is so thin as to require, and have, a paper backing to facilitate handling. At any rate, it is opaque to visible light. The film 4 on the sheet may be of a thickness of a few hundredths of an inch, or one or more thousandths of an inch. The film 4 is frequently a transparent plastic. It is transparent to infra-red rays and may be transparent also to other invisible rays as well as to visible rays. It is important to be able to measure the thickness of the film 4 and to provide an indication where the film thickness is outside of the prescribed maximum and minimum limits.

Figure 1:
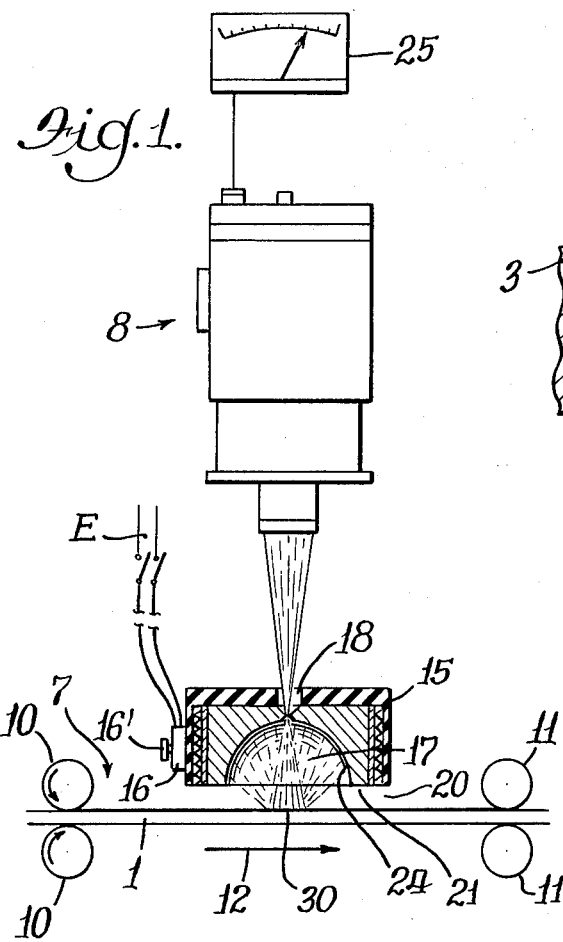
FIG. 1 is a diagrammatic view of an apparatus embodying the present invention.
Figure 2:
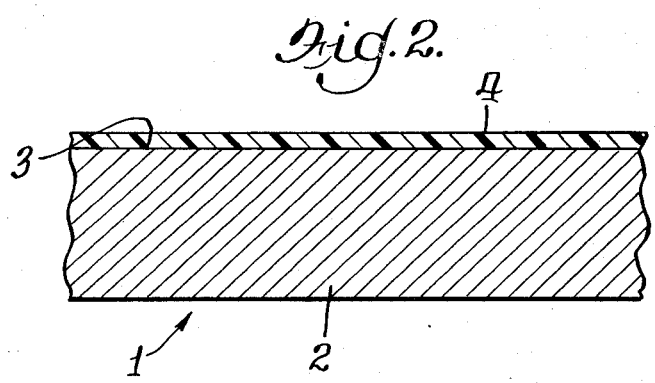
FIG. 2 is an enlarged cross-sectional view through a portion of a sheet or substrate having a protective film whose thickness is to be measured.

The sheet 1 is passed through a station 7 of a measuring apparatus 8 of FIG. 1. The sheet is maintained in position at said stations by pairs of rollers 10—10 and 11—11, the sheet moving between the rollers in the direction indicated by the arrow 12.

The measuring apparatus 8 utilizes a beam from a radiation source containing energy in a wave length region of strong absorption by the film 4. As the beam passes through the film, it will be strongly absorbed in its passage. The intensity of the energy of the beam will drop off exponentially as it passes through the plastic film 4. Since the substrate 2 is opaque to the wave length of the source of energy used, this invention utilizes the reflecting properties of the surface 3 to cause the radiation beam to traverse through twice the thickness of the film. The source of radiation should be such as to emit only the wave length region of strong absorption or the detector used must be such as to measure only in the wave length region of strong absorption. The instrument can be calibrated by passing through it a substrate 2 that lacks the film 4 (a film or zero thickness). Subsequently upon passing through the station a substrate having a film 4 thereon, the film absorbs some of the radiation. Since this absorption is a function of the thickness of the film, the instrument can be correspondingly calibrated.

The source of illumination, indicated at 15, is a black-body radiator electrically heated to a constant temperature under control of a thermostatic regulator 16 to produce radiation of a known wave length. The regulator controls the heating circuit for the radiator 15 from a source of electricity E. An adjusting knob 16′ enables setting of the regulator 16 for any desired temperature of the radiator 15 within its range. The radiator 15 has a hemispherical cavity 17 having an observation opening or hole 18 in the form of a circular pin hole with a knife edge 19. Rollers 10—10 and 11—11 maintain a proper spacing 20 between the sheet 1 and the radiator 15, preferrably small as possible while avoiding contact between the sheet 1 and the radiator 15 as the sheet vibrates or bounces in its movement through the station 7. Infra-red light from the interior radiator surface 24 passes through the film 4, is reflected at 3 and then passes out through the film and through the opening 18 to the apparatus 8. The apparatus 8 is an electronic pyrometer of the type used to measure surface temperature by measuring the infrared radiation from the surface. The output of the apparatus 8 is read on an instrument 25. The dial of the instrument 25 can be calibrated in terms of thickness of the film.

The reflective aluminum substrate serves to reflect the beam of energy back through the plastic and make the film appear to be twice its true thickness.

The substrate, although in this particular instance is aluminum, need not be of this material but can be of any material which reflects in the same wave length region as the film absorps.

The substrate may be visibly transparent and this is of no consequence as long as it exhibits a reflective characteristic at some wave length where the film absorps.

The reflecting surface of the substrate material may be of specular reflection characteristics or it may be rough and disperse the energy illuminating its surface. Under such circumstances, it is most desirable to use an extended area source of energy. The term "extended area" is used to mean that the source 15 should approach covering the entire hemisphere over the portion or area 30 being measured at any given instant. Thus, the reflection measured will be the hemispherical value and will eliminate alignment problems which might plague the system using a small source area and set up only for specular reflections where the reflecting substrate is rough and/or the coating is pigmented. For this reason, the diameter of the isothermal cavity is large in comparison with the open area of the opening 18 and its distance from sheet 1.

When the film temperature is substantially room temperature and the temperature of the black-body radiator is of the order of 600°F, the temperature difference between the two is high and no material measurement error will result from the energy emitted by the film 4 due to its own temperature. In one construction the radiation pyrometer 8 operated at a wave length of 3.43 microns. The black-body cavity temperature was 600°F.

While the cavity 17 herein shown is hemispherical, that particular shape is not crucial. It is desirable that a line drawn from any point on the edge 21 to the edge of the area 30 being scanned through the opening 18 shall make a minimum angle with the surface of the moving film.

Figure 3:
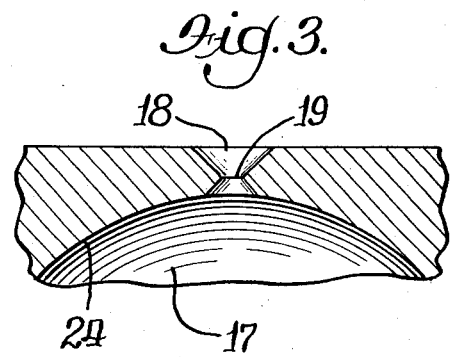
FIG. 3 is a fragmentary enlarged sectional view through the observation window of the black-body radiator of FIG. 1.
Figure 4:
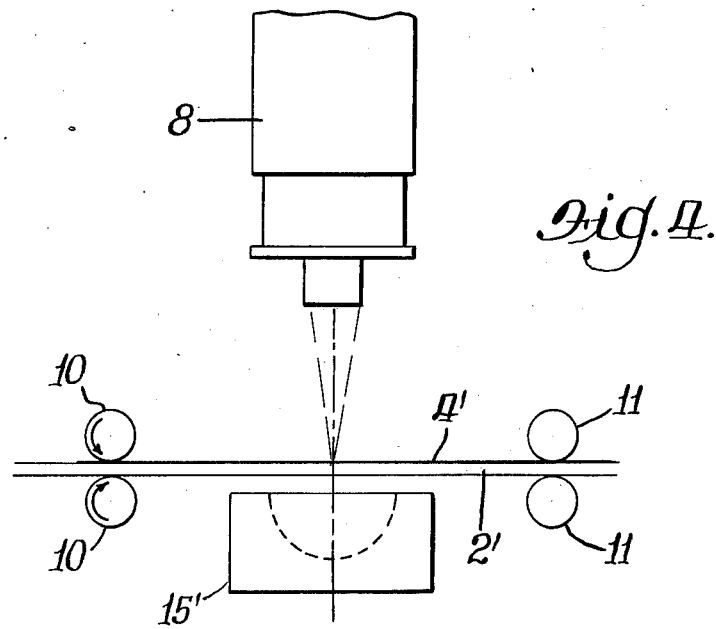
FIG. 4 is a diagrammatic view illustrating the use of the present invention for measuring thickness of a sheet that is transparent to the rays being sent therethrough.

If the substrate is highly transparent in the wave length region of film absorption, then the detector 8 and the black-body source of radiation would be placed on opposite sides of the object whose thickness is to be measured. This is illustrated in FIG. 4 wherein the substrate, indicated at 2′, having a protective film 4′, are both transparent to the wave length of infra-red rays emitted by the black-body radiator 15′ (which is the same as 15 but may omit the pin hole opening 18 of FIG. 3). In this instance, the coated sheet is placed between the black-body radiator 15′ and the radiation pyrometer 8. The instrument is calibrated to read film thickness as indicated by absorption of infra-red rays through the film 4′ in a single passage therethrough (as distinguished from the double passage in the case of FIG. 1). The substrate 2′ of FIG. 4 is of a precise thickness attained in normal manufacture thereof. The film 4′ may be faulty as for instance by being interrupted or of zero thickness in some spaced small areas.

What is claimed as new is:

1. Apparatus for examining the thickness of a moving film, comprising a body having an area constituting a source of infrared rays across which a film to be examined may be moved, means for heating the area to a constant temperature for maintaining uniform infrared light intensity throughout said area, and infrared ray measuring means positioned to receive rays from said source that have passed through a part of said moving film for determining the diminution of intensity of such infrared rays in passing through the film.

2. The combination of claim 1 wherein the temperature is such that the energy of the infrared light transmitted from the surface of the film due to its own temperature is of a magnitude that is inconsequential compared to the infrared energy transmitted from said source thru said film to said measuring means.

3. The combination of claim 2 wherein the body has an observation opening through said area substantially centrally thereof for transmitting infrared light rays from said area that pass through said film, said infrared ray measuring means being in position to receive said transmitted rays.

4. The combination of claim 3 wherein the observation opening is substantially a pin-hole.

5. The combination of claim 1 wherein the means for measuring light measures essentially light of a wave length of the order of 3.4 microns.

6. In combination, means forming a black body infra-red radiator constituting an isothermal cavity having an opening across which a to-be examined sheet may be moved, said means having an observation hole therethrough positioned to permit scanning through said hole of a part of the area encompassed by said opening, and a pyrometer scanning a restricted area through said observation hole.

7. The combination of claim 6 wherein the minimum distance between the perimeter of the opening across which the film is moved and said part is many times the maximum dimension of said area.

8. The combination of claim 6 wherein there is provided means for maintaining said cavity at a temperature to emit infrared radiation that is predominantly of a wave length of the order of 3.4 microns.

9. The combination of claim 6 with means for moving a sheet to be examined across the cavity opening, said last means including means for maintaining said moving sheet at a distance from the perimeter of the isothermal body which is a minor fractional part of the maximum dimension across the cavity.

10. A combination according to claim 6 wherein an infrared ray reflector which is opaque to the infrared light of the radiator is on the side of the sheet remote from the radiator so that light from the radiator passing through the sheet is reflected back through the sheet and constitutes at least a part of the light from the radiator that passes through the observation hole to influence the pyrometer.

11. Apparatus for examining for the thickness of a film on a moving sheet that comprises the film and a substrate, wherein the film is of the kind thru which infrared rays can pass but with substantial absorption and the substrate is opaque to but a reflector of infrared rays, which apparatus includes an isothermal body constituting an infrared radiator having an infrared radiating area across which the sheet to be examined may be moved with the film-side of the sheet facing that area, said area having an observation opening therethrough positioned to permit scanning through said opening of a portion of the film encompassed by said area, and a pyrometer responsive to infrared light from said area that passes through the film and is reflected by the substrate and then passes through the film in the opposite direction and then out through said observation opening.

12. Apparatus according to claim 11 wherein the radiator constitutes a dome over the part of the film being scanned at any instant.

13. The method of examining the thickness of a film on a sheet which comprises: providing a radiator body having an infrared radiating area, heating said area to maintain a substantially uniform infrared light emission throughout the area, moving a film across said area, and measuring infrared rays from said area that have passed through the moving film to determine the extent to which those rays have been reduced in intensity by their passage through the film.

14. The method of claim 13 wherein the area is heated to a temperature above the temperature of the film such that the energy of the infrared rays emitted from the film due to its own temperature is negligible as compared to the energy of the rays transmitted therethrough from said radiator and measured.

15. The method of claim 14 wherein the light measured is restricted to that which is of a wave length to which the film is transparent but which is absorbed by the film to an extent that varies as a function of the film thickness.

16. The method of claim 15 wherein the light that is measured is essentially light of a wave length of 3.4 microns.

* * * * *

UNITED STATES PATENT OFFICE
CERTIFICATE OF CORRECTION

Patent No. 3,973,122        Dated August 3, 1976

Inventor(s) Arthur E. Goldberg

It is certified that error appears in the above-identified patent and that said Letters Patent are hereby corrected as shown below:

On the title page, Item [73] should read:

--- Ircon Inc. ---.

Signed and Sealed this

First Day of November 1977

[SEAL]

Attest:

RUTH C. MASON
*Attesting Officer*

LUTRELLE F. PARKER
*Acting Commissioner of Patents and Trademarks*